US012746879B2

(12) United States Patent
Uehara

(10) Patent No.: US 12,746,879 B2
(45) **Date of Patent: *Sep. 29, 2026**

(54) STORAGE DEVICE FOR VEHICLE

(71) Applicant: MORIROKU TECHNOLOGY COMPANY, LTD., Tokyo (JP)

(72) Inventor: Takuya Uehara, Tokyo (JP)

(73) Assignee: MORIROKU CO., LTD., Tokyo (JP)

( * ) Notice: Subject to any disclaimer, the term of this patent is extended or adjusted under 35 U.S.C. 154(b) by 244 days.

This patent is subject to a terminal disclaimer.

(21) Appl. No.: 18/768,613

(22) Filed: Jul. 10, 2024

(65) Prior Publication Data

US 2024/0359630 A1 Oct. 31, 2024

Related U.S. Application Data

(62) Division of application No. 17/747,148, filed on May 18, 2022, now Pat. No. 12,065,103.

(30) Foreign Application Priority Data

May 24, 2021 (JP) ................................ 2021-086903

(51) Int. Cl.
*B60R 7/04* (2006.01)
*E05B 83/32* (2014.01)
*E05C 3/16* (2006.01)
*E05C 3/30* (2006.01)

(52) U.S. Cl.
CPC ................ *B60R 7/04* (2013.01); *E05B 83/32* (2013.01); *E05C 3/162* (2013.01); *E05C 3/30* (2013.01)

(58) Field of Classification Search
CPC ... B60R 7/04; B60R 7/06; E05B 83/32; E05C 3/30; E05C 3/162
USPC ............................................ 296/24.34, 37.8
See application file for complete search history.

(56) References Cited

U.S. PATENT DOCUMENTS

| | | | | |
|---|---|---|---|---|
| 6,802,550 | B1 | 10/2004 | Griggs | |
| 10,352,071 | B2 | 7/2019 | Muntean | |
| 10,533,351 | B2 | 1/2020 | Yano | |
| 12,065,103 | B2 * | 8/2024 | Uehara | E05C 3/14 |
| 2018/0371808 | A1 | 12/2018 | Yano | |

(Continued)

FOREIGN PATENT DOCUMENTS

| | | |
|---|---|---|
| JP | 5-28749 | 4/1993 |
| JP | 2010-163097 A | 7/2010 |

*Primary Examiner* — Jason S Daniels
(74) *Attorney, Agent, or Firm* — Rankin, Hill & Clark LLP

(57) ABSTRACT

A vehicle storage device has a locking device that can keep a lid in a closed condition. The locking device includes an operation member for performing an unlocking operation of the lid, an engagement member that can be engaged with the storage portion and its engaged state is released when the operation member is operated, a first spring that biases the operation member toward a standby position in a locked state, and a second spring that biases the engagement member toward an engagement position in which the engagement member is engaged with the storage portion. The engagement member has a hook-shaped hook portion that can engage with the storage portion, and the second spring is disposed to face a rear face of the engagement member such that the second spring biases the hook portion toward the storage portion from the rear face of the engagement member.

5 Claims, 7 Drawing Sheets

(56) References Cited

U.S. PATENT DOCUMENTS

| | | | | |
|---|---|---|---|---|
| 2022/0316245 | A1* | 10/2022 | Le Borgne .............. | E05C 19/06 |
| 2022/0325566 | A1 | 10/2022 | Takagi | |

* cited by examiner

STORAGE DEVICE FOR VEHICLE

FIELD OF THE INVENTION

The present invention relates to a storage device for a vehicle, which can receive and store goods and belongings (i.e., things) of a person in the vehicle.

BACKGROUND OF THE INVENTION

Many vehicles are equipped with a vehicle storage device capable of receiving and storing goods and belongings of a person in the vehicle. As a conventional technique relating to a storage device for a vehicle, there is a technique disclosed in Japanese Utility Model Application Laid-Open Publication No. H05-28749.

A storage device for a vehicle, an example of which is disclosed in Japanese Utility Model Application Laid-Open Publication No. H05-28749, includes a storage portion whose upper face is open to receive things therein, a lid that can close and open the upper face of the storage portion, and a locking device provided in a front portion of the lid to maintain the lid body in a closed condition.

The locking device has an operation member that is displaceable in the front-rear direction such that a person in the vehicle uses the operation member to perform an unlocking operation, a hook portion that is disengaged from the storage portion upon pushing the operation member, and a screw coil spring that biases the operation member toward the front to return the operation member.

SUMMARY OF THE INVENTION

In the vehicle storage device disclosed in Japanese Utility Model Application Laid-Open Publication No. H05-28749, if the size of the locking device of the vehicle storage device is reduced, it is possible to reduce the size of the vehicle storage device and/or to increase the storage portion, which is preferred.

An object of the present invention is to provide a vehicle storage device that has a smaller locking device.

According to one aspect of the present invention, there is provided a storage device for a vehicle that includes a storage portion that has an opening in its one face and can store at least one thing therein, a lid that is provided on the storage portion and can open and close at least a portion of the opening of the storage portion, and a locking device that can keep the lid in a closed condition,

- the locking device including an operation member for performing an unlocking operation of the lid, an engagement member that is provided such that the engagement member can be engaged with the storage portion and its engaged state is released when the operation member is operated, a first spring that biases the operation member toward a standby position in a locked state, and a second spring that biases the engagement member toward an engagement position in which the engagement member is engaged with the storage portion,
- the engagement member having a hook-shaped hook portion that can engage with the storage portion, and
- the second spring is disposed to face a rear face of the engagement member such that the second spring biases the hook portion toward the storage portion from the rear face of the engagement member.

According to the present invention, it is possible to provide a vehicle storage device having a smaller locking device.

DETAILED DESCRIPTION OF THE PREFERRED EMBODIMENTS

Figure 1:
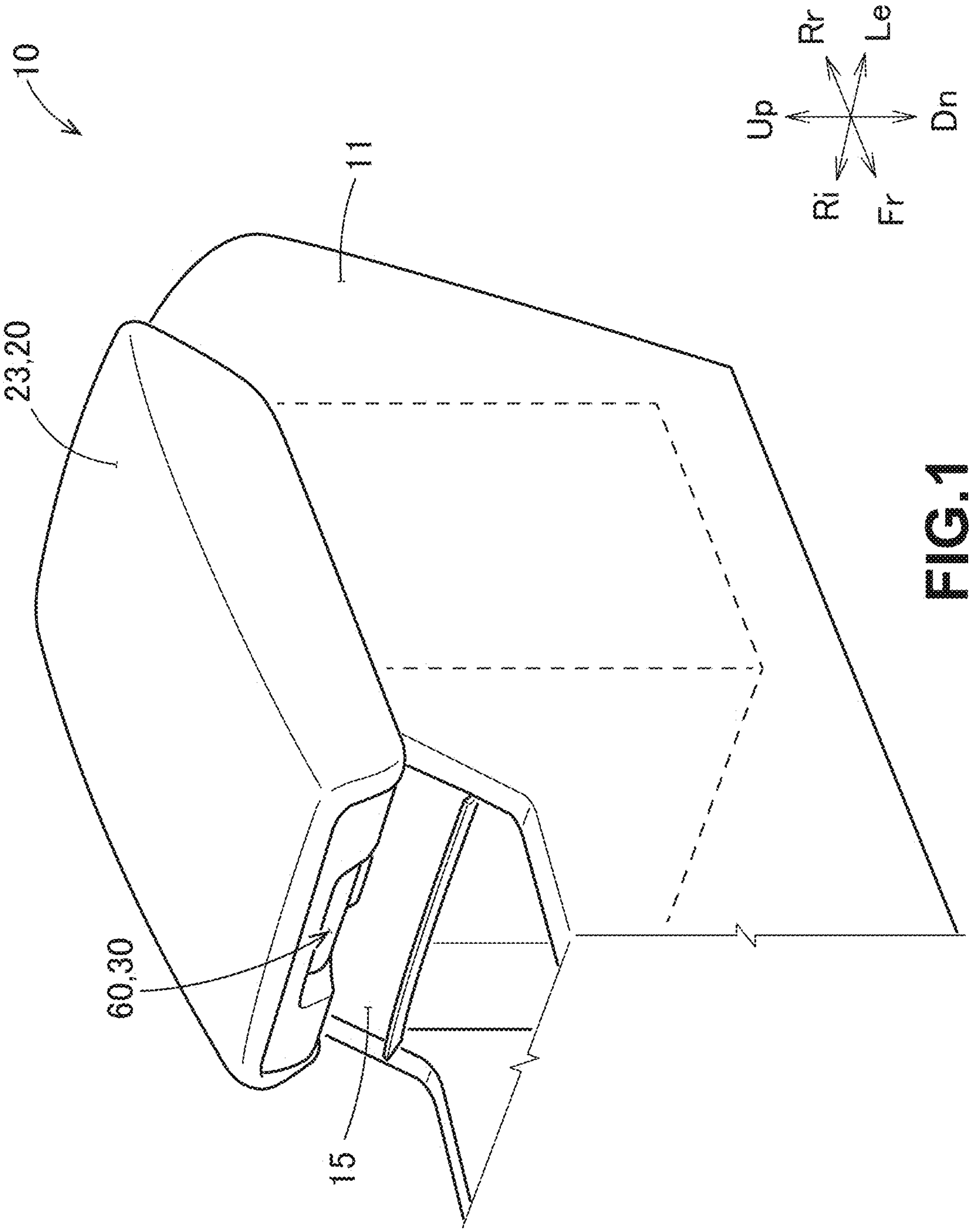
FIG. 1 is a perspective view of a vehicle storage device according to an embodiment of the invention.

Embodiments of the present invention will be described below with reference to the accompanying drawings. In the following description, the terms "left" and "right" refer to the left and right when viewed from a person in a vehicle, and the terms "front" and "rear" refer to the front and rear when viewed in the traveling direction of the vehicle. In addition, "Fr" in the drawing represents the front, "Rr" represents the rear, "Le" represents the left when viewed from the person in the vehicle, "Ri" represents the right when viewed from the person in the vehicle, "Up" represents the top or up, and "Dn" represents the bottom or down.

EMBODIMENTS

Referring to FIG. 1, a storage device 10 for a vehicle (hereinafter, abbreviated as "storage device 10") is, for example, a console box provided between a driver's seat and a passenger's seat.

Figure 2:
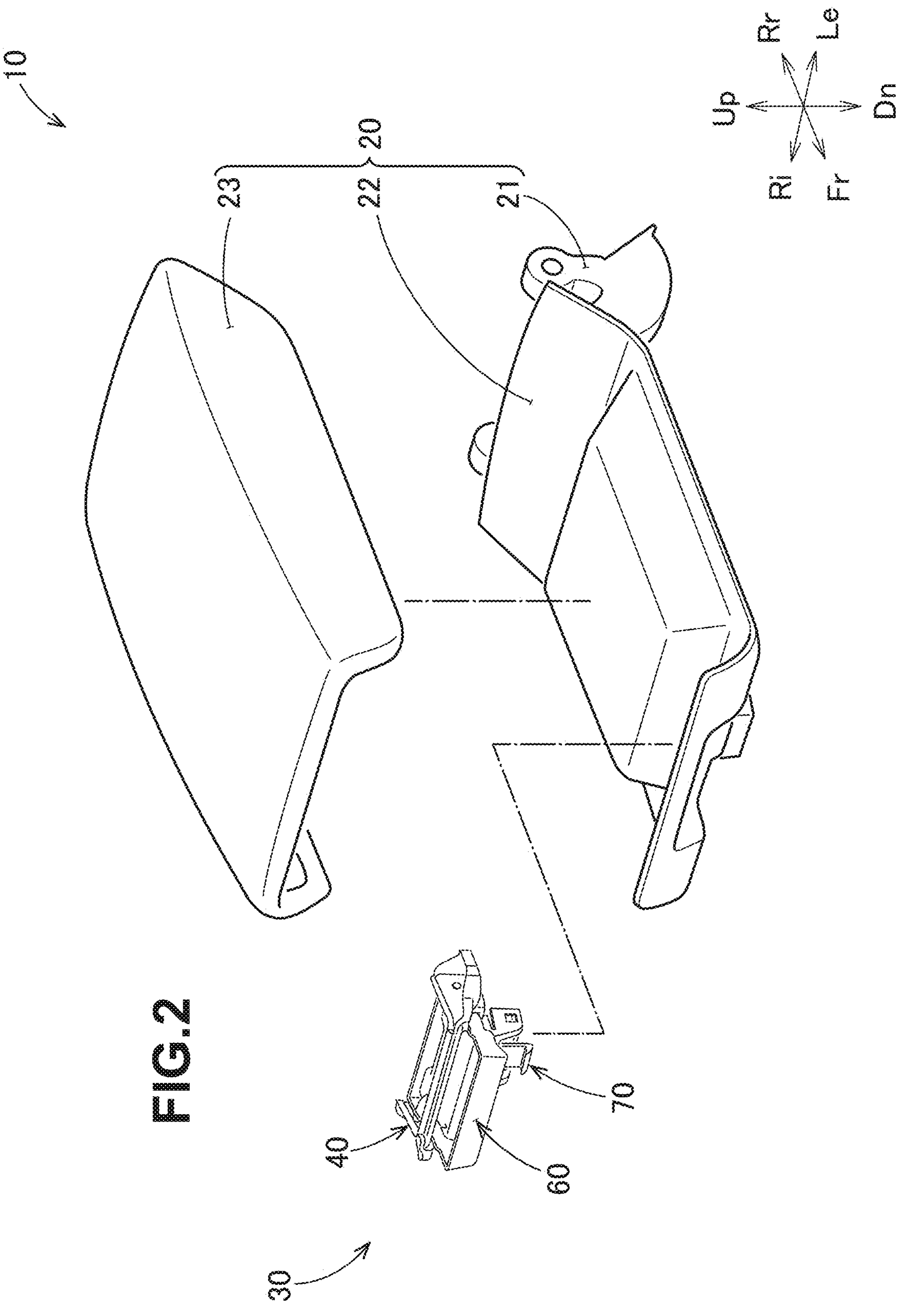
FIG. 2 is an exploded perspective view of a lid and a locking device shown in FIG. 1.
Figure 3:
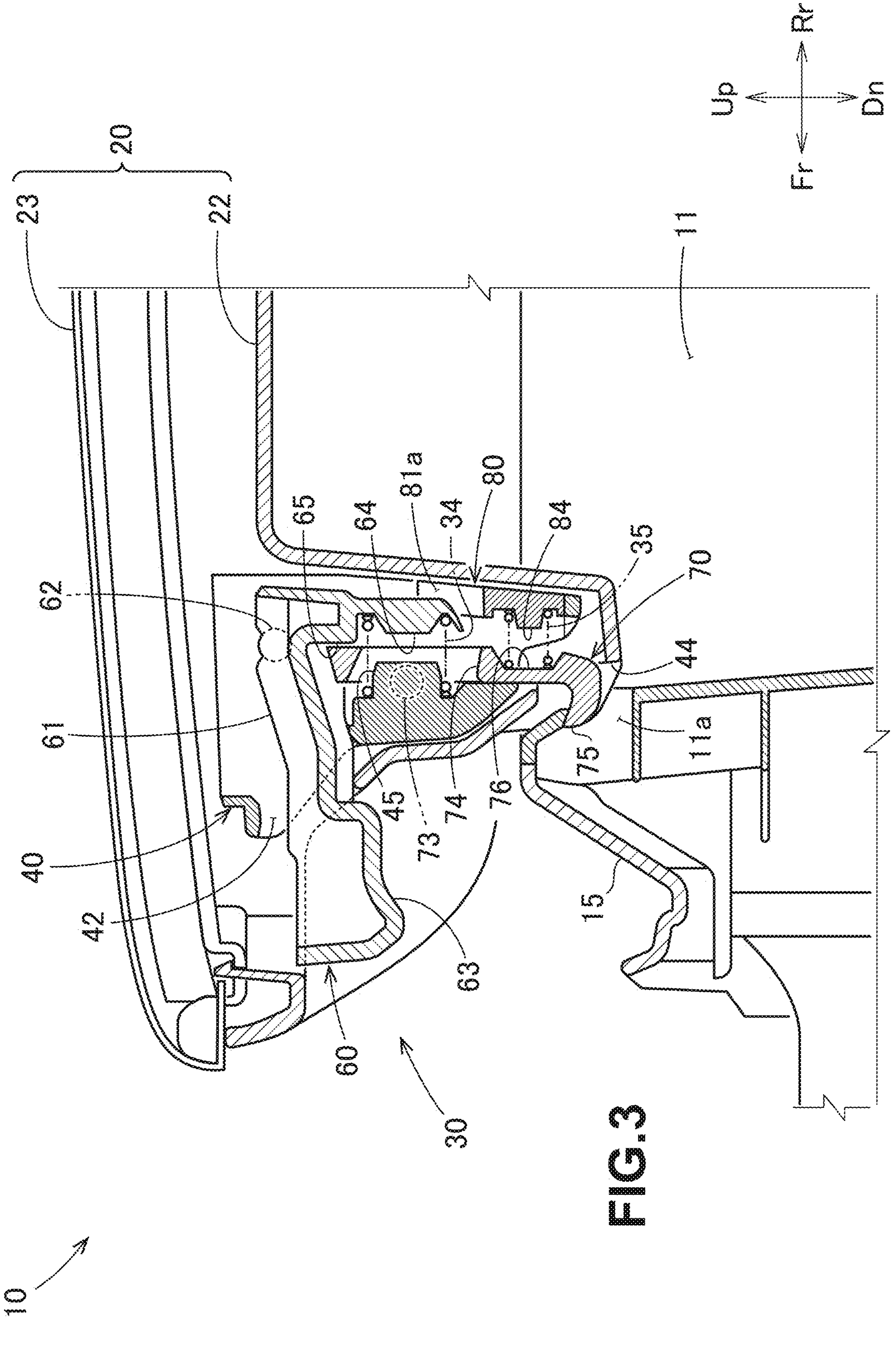
FIG. 3 is a cross-sectional view of a front portion of the vehicle storage device shown in FIG. 1 when viewed from a lateral direction.

Referring to FIG. 2 and FIG. 3, the storage device 10 includes a storage portion 11 that has an opening in its upper face (one face) and can receive and store things such as goods and belongings of a person in the vehicle, a lid 20 that is swingably supported by the storage portion 11 and can close and open the opening of the storage portion 11, a locking device 30 that can keep the lid 20 in a closed condition, and a plate-like plate member 15 provided at a front portion of the storage portion 11 and situated below the lid 20.

Referring to FIG. 3, the storage unit 11 is a resin box-shaped member. The front portion of the storage portion 11 has an engagement hole 11*a* that can engage with the locking device 30. The area in front of the engagement hole 11*a* is covered with the plate member 15.

Incidentally, in addition to or in place of a structure for engaging the locking device 30 with an edge of the engagement hole 11*a*, the storage portion 11 may be equipped with a striker for engaging with the locking device 30.

Referring to FIG. 2, the lid 20 includes left and right arm portions 21 that are rotatably supported by the storage portion 11, a lower lid body 22 that is supported by the arm portions 21 and can cover the opening of the storage portion 11, and an upper lid body 23 extending over the lower lid body 22.

The lid 20 may be slidably provided with respect to the storage portion 11. Further, the arm portions 21 may be biased in a direction to open the upper face of the storage portion 11.

The locking device 30 is fixed to the front portion of the lower lid body 22 and its upper portion is covered with the upper lid body 23.

Figure 4:
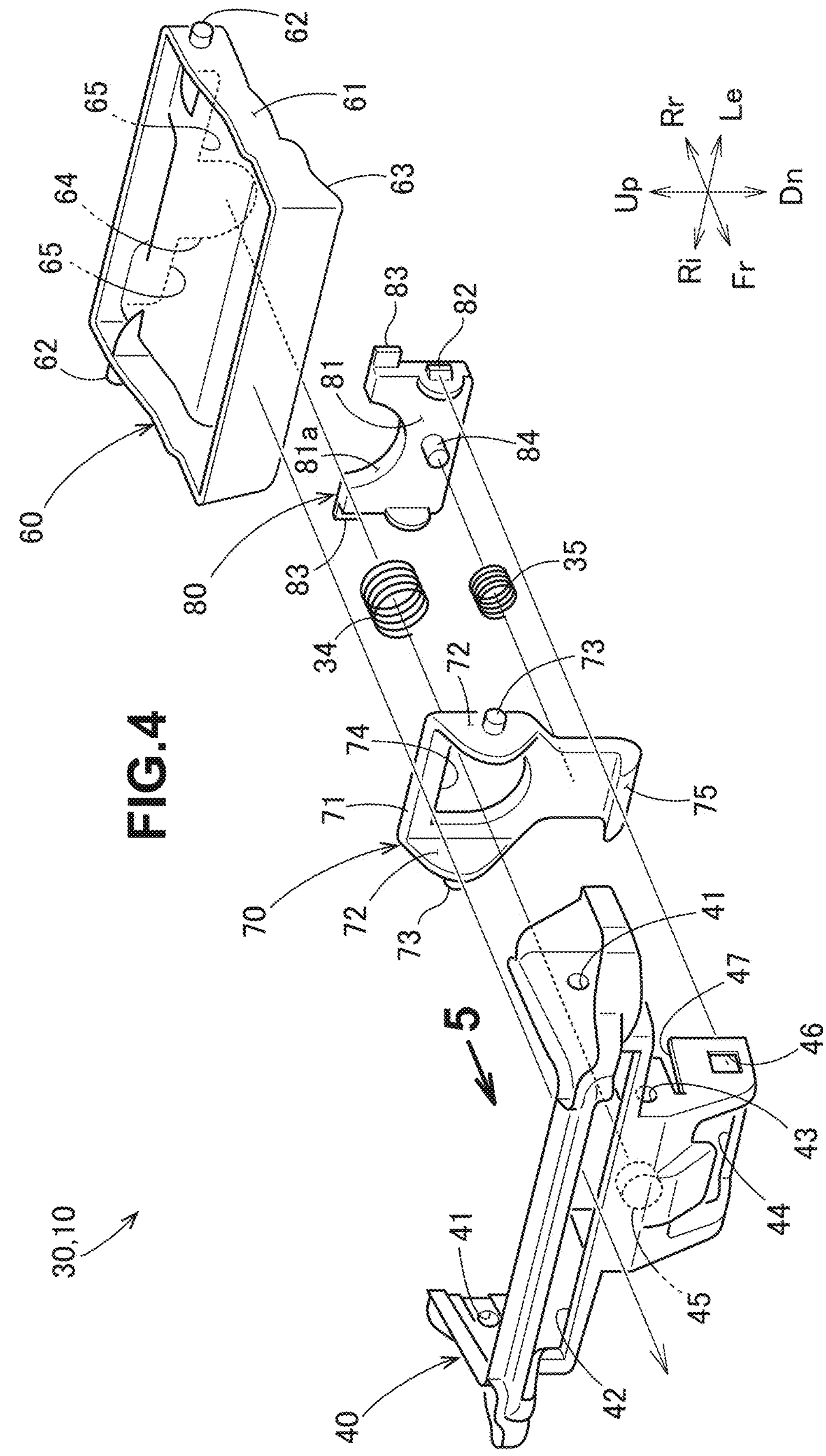
FIG. 4 is an exploded perspective view of the locking device shown in FIG. 2.

Referring to FIG. 3 and FIG. 4, the locking device 30 includes a support member 40 fixed to the lower lid body 22, an operation member 60 swingably provided on the support member 40, an engagement member 70 swingably provided on the support member 40, a first spring 34 that biases the operation member 60 in the returning direction (locking direction), a second spring 35 that biases the engagement member 70 in the returning direction (locking direction), and a second spring support member 80 that holds the second spring 35.

Figure 5:
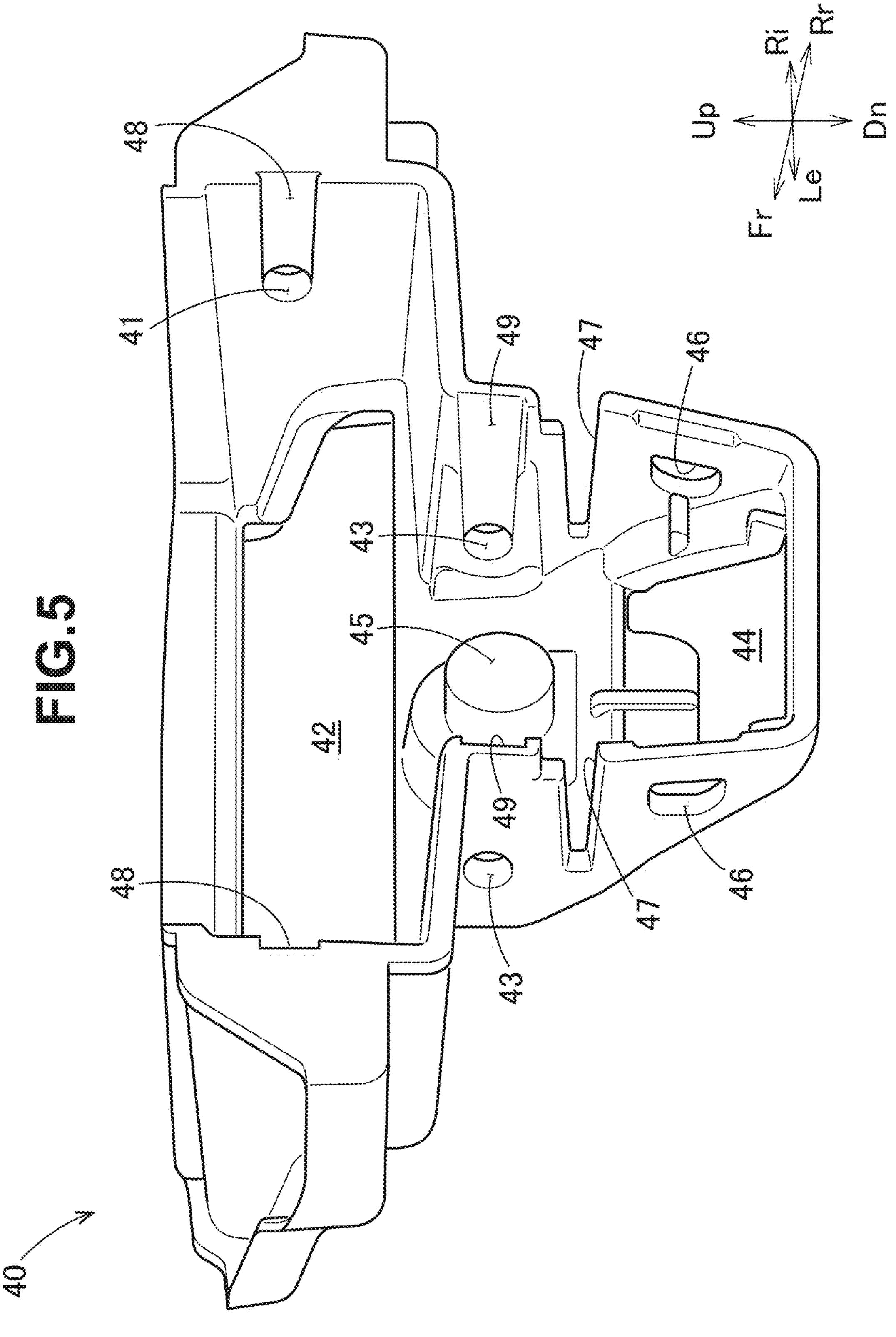
FIG. 5 is a diagram when looked at in the direction of the arrow 5 in FIG. 4.

Referring to FIG. 4 and FIG. 5, the support member 40 is made of resin, for example, and has a substantially T-shape with an open rear face and an open top face. The support member 40 includes, as its integral parts, support portions 41 for the operation member, which swingably support the operation member 60, a through hole 42 for the operation member, through which the front portion of the operation member 60 extends, support portions 43 for the engagement member, which swingingly support the engagement member 70, a through hole 44 for the engagement member, into which the lower end of the engagement member 70 moves, a first holding portion 45 of the support member, which holds the front portion of the first spring 34, securing portions 46 for the second spring support member, which are open to fix the second spring support member 80, slit-like positioning portions 47 for the second spring support member, in which the second spring support member 80 is engaged and positioned, slot-like first grooves 48 that extend from the rear end of the opening to the support portion 41 for the operation member, and second grooves 49 that extend from the rear end to the support portions 43 for the engagement member.

Each of the support portions 41 for the operation member and the support portions 43 for the engagement member is constituted by a round hole drilled to receive a round bar-shaped pin, and can hold the rotating round bar-shaped pin. Each of the support portions 41 for the operation member and the support portions 43 for the engagement member may be constituted by a cylindrical hole having a bottom, rather than the through hole.

The first holding portion 45 of the support member is formed in a cylindrical shape that extends to the rear. The first holding portion 45 of the support member may be formed of a cross-shaped rib or the like. The first holding portion 45 of the support member is formed at an approximate center of the support member 40 when looked at in the width direction of the support member 40.

Each of the securing portions 46 for the second spring support member is formed in a substantially rectangular hole shape.

The first grooves 48 serve as guides to the support portions 41 of the operation member when attaching the operation member 60. Similarly, the second grooves 49 serve as guides to the support portions 43 of the engagement member when attaching the engagement member 70.

Referring to FIG. 3 and FIG. 4, the operation member 60 is an element operated by a person in the vehicle to unlock the engagement member 70 when the engagement member 70 in a locked state, i.e., when the engagement member 70 is engaged with the storage portion 11 (the state shown in FIG. 3). In other words, the operation member 60 is a member for performing the unlocking operation to the lid 20.

The operation member 60 includes, as its integral parts, a substantially box-shaped main body 61 of the operation member, which has an open top, operation shaft portions 62 that are provided on the left and right sides of the main body 61 of the operation member, respectively, such that the operation shaft portions 62 are rotatably inserted into the support portions 41 for the operation member, a handle portion 63 extending downward from the front portion of the main body 61 of the operation member such that a person in the vehicle can cause the handle portion 63 to swing (pivot) upward, and a first holding portion 64 of the operation member, which is provided at the lower part of the rear end of the man body 61 of the operation member to hold the rear end of the first spring 34. The operation member 60 is swingable in the up and down directions about the operation shaft portions 62.

Figure 6:
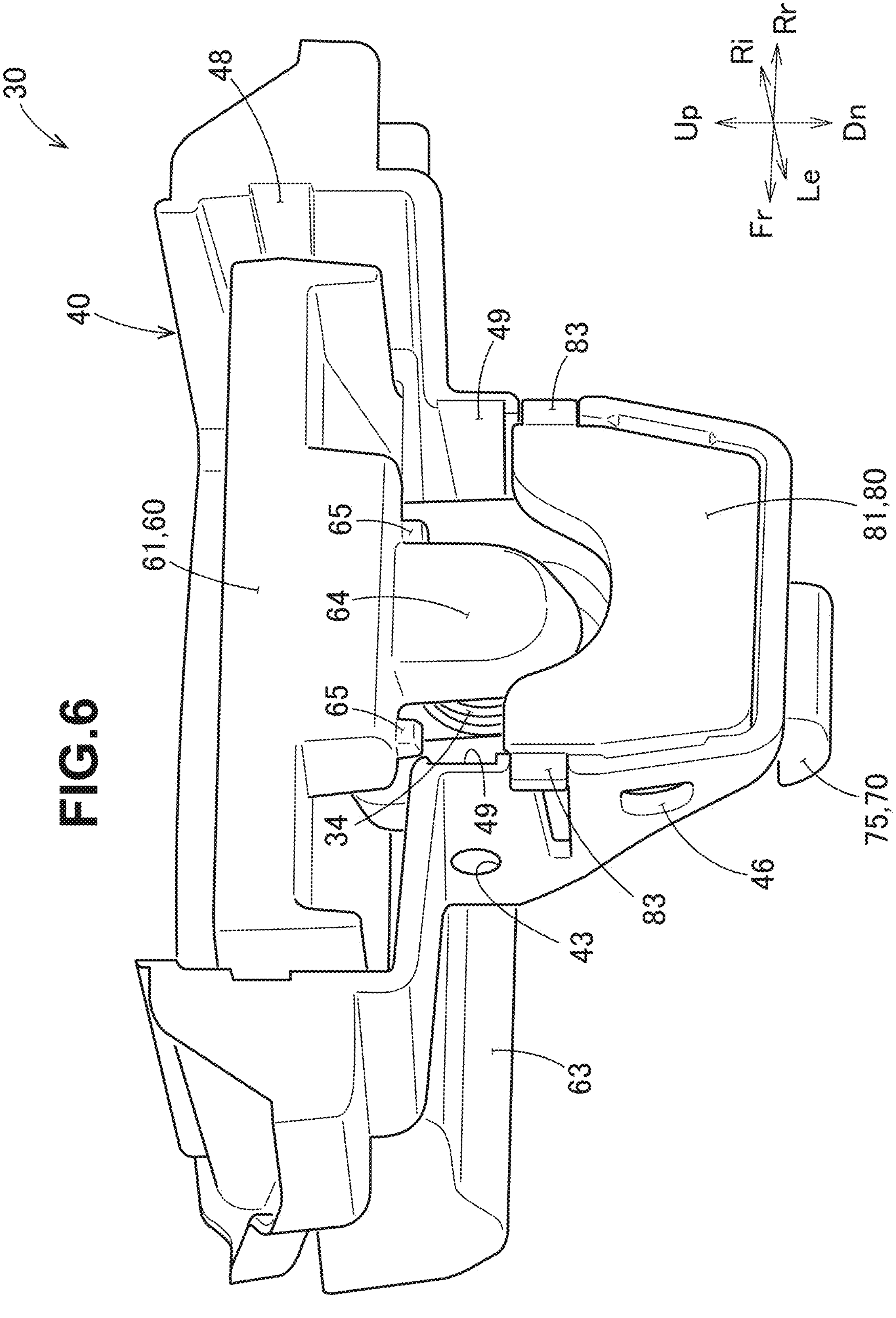
FIG. 6 is a perspective view of the locking device when viewed from the rear.

Referring to FIG. 6, the operation member 60 further has first contact portions 65 that are formed on the left and right of the first holding portion 64 of the operation member, respectively, such that the first contact portions 65 can abut against the engagement member 70 (see FIG. 3).

Referring to FIG. 4, each of the operation shaft portions 62 has a cylindrical pin shape, and is formed at a position closer to the first holding portion 64 of the operation member than the center of gravity of the operation member 60. The center of gravity of the operation member 60 is present between the operation shaft portions 62 and the handle portion 63.

A front end of the handle portion 63 is exposed to the vehicle interior from the through hole 42 of the support member.

During the locked state, the first holding portion 64 of the operation member is substantially coaxial with the first holding portion 45 of the support member.

The engagement member 70 includes a substantially plate-shaped main body 71 that extends vertically, wall portions 72 that extend forward from the left and right edges of the main body 71, respectively, engagement shaft portions 73 that protrude from the wall portions 72, respectively, and become the center of the swinging movements, and a through hole 74 formed in the main body 71 such that the first spring 34 extends through the through hole 74.

Referring to FIG. 3, the engagement member 70 includes a hook portion 75 that is formed in a hook shape at the lower end of the main body 71 of the engagement member and can be engaged with the edge of the engagement hole 11*a*, and a second contact portion 76 of the engagement member, which is formed in a concave shape in the rear face (back face) of the main body 71 and contacts the second spring 35.

The through hole 74 is formed at a position overlapping the engagement shaft portions 73. Even if the through hole 74 is small, it is possible to prevent interference with the first spring 34.

The first spring 34 is a compression coil spring. The axis of the first spring 34 extends in the front-rear direction. The first spring 34 biases the first holding portion 64 of the operation member toward the rear. In the condition shown in FIG. 3, the operation member 60 is biased in the counter-clockwise direction about the shaft portions 62 of the operation member.

The second spring 35 is a compression coil spring. The axis of the second spring 35 extends in the front-rear direction. The axis of the second spring 35 extends substantially parallel to and below the axis of the first spring 34. The second spring 35 biases the second contact portion 76 of the engagement member toward the front. In FIG. 3, the engagement member 70 is biased in the clockwise direction about the shaft portions 73 of the engagement member. That is, the engagement member 70 is biased in the direction opposite to the biased direction of the operation member 60.

Hereinafter, the direction in which the axis of the first spring 34 and the axis of the second spring 35 extend (i.e., front-rear direction) may occasionally be referred to as a first direction, the direction that is perpendicular to the first direction and passes through the axis of the first spring 34 and the axis of the second spring 35 (i.e., up-down direction) may occasionally referred to as a second direction, and the direction perpendicular to the first direction and the second direction may occasionally be referred to as a third direction (i.e., the right-left direction or the width direction of the locking device 30). The first spring 34 and the second spring 35 are disposed in overlapping positions at the approximate center of the operation member 60 when looked at in the third direction.

Referring to FIG. 4 and FIG. 6, the second spring support member 80 includes a plate-shaped second support main body 81, second protrusions 82 that protrude from the left and right sides of the second support main body 81 and are fixed to the fixing portions 46 of the support member, second positioning claw portions 83 that protrude from the left and right sides of the second support main body 81 and are inserted into the positioning portions 47 of the support member, and a second holding portion 84 of the second spring support member which holds the rear end of the second spring 35.

The second support main body 81 includes a first spring avoiding portion 81*a*, which has a downward concave shape, to avoid the first spring 34 and the first holding portion 64 of the operation member.

The operation of the above-described storage device 10 will be described below.

Figure 7:
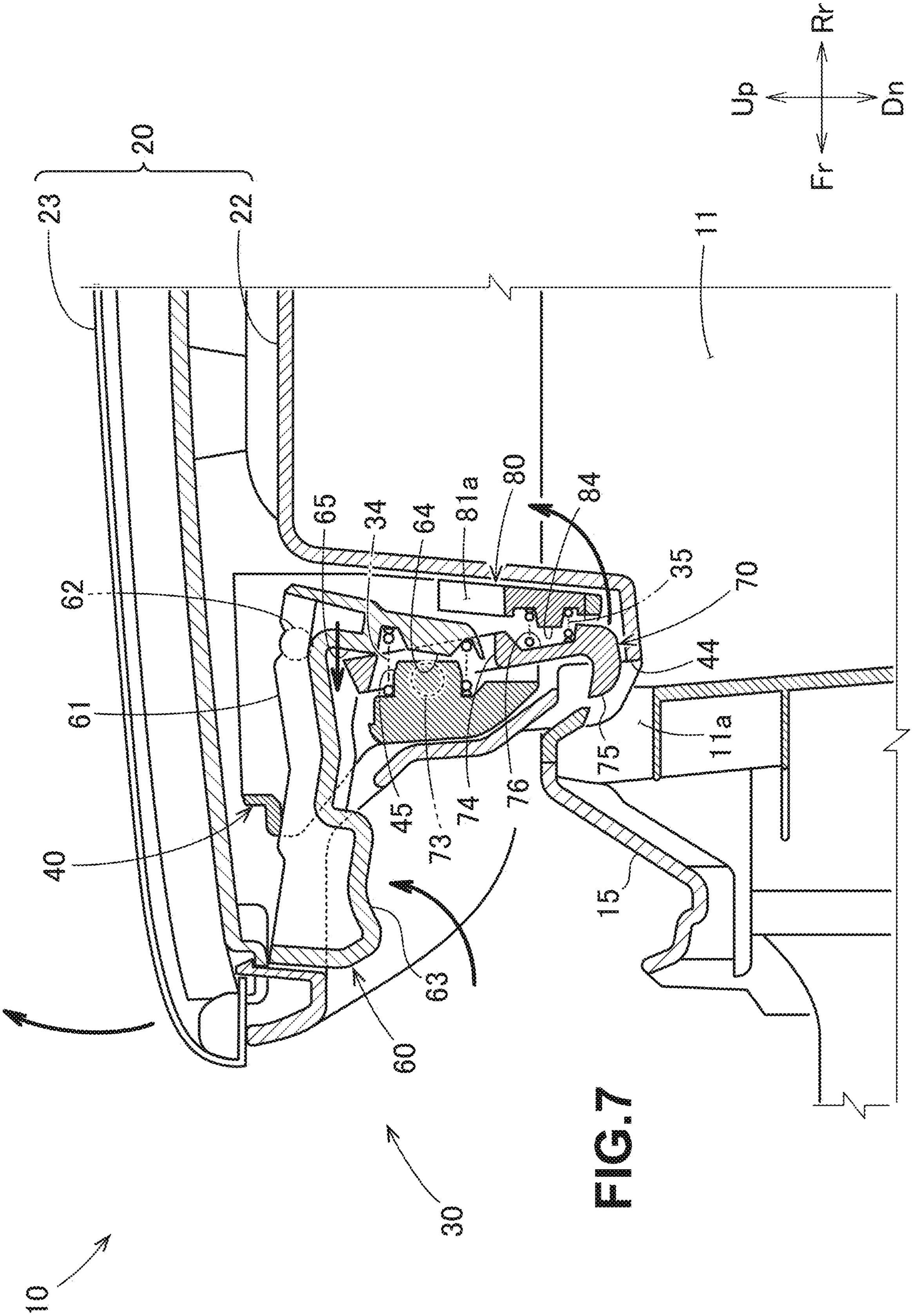
FIG. 7 is a diagram useful to describe a function of the vehicle storage device shown in FIG. 3.

Referring to FIG. 3 and FIG. 7, when opening the lid 20 from the closed condition, the person in the vehicle pushes the handle portion 63 upward against the biasing force of the first spring 34. This causes the operation member 60 to rotate about the operation shaft portions 62, and the first contact portions 65 presses the engagement member 70. The engagement member 70 pressed by the operation member 60 rotates about the engagement shaft portions 73 against the biasing force of the second spring 35. As a result of the rotating movement of the engagement member, the hook portion 75, which has been engaged with the engagement hole 11*a*, moves out from the engagement hole 11*a*. That is, the locked state is released. Thus, it is possible to cause the lid 20 to swing in the opening direction.

When closing the lid 20 from the open state, the person in the vehicle pushes the lid until the hook portion 75 is engaged with the edge of the engagement hole 11*a*. As shown in FIG. 3, when the hook portion 75 is engaged with the edge of the engagement hole 11*a*, the operation member 60 is biased to a standby position by the biasing force of the first spring 34. The engagement member 70 is biased to the engagement position by the biasing force of the second spring 35.

The above-described storage device 10 will be summarized below.

The first spring 34 is provided through the through hole 74 formed in the engagement member 70. Because the first spring 34 extends through a portion of the engagement member 70, the first spring 34 can be disposed close to the engagement member 70, and therefore it is possible to reduce the size of the locking device 30. It is then possible to provide the vehicle storage device 10 having the small locking device 30.

Further, because the first spring 34 is provided through the engagement member 70, the first spring 34 can bias the position away from the swing axis of the operation member 60. Thus, even if the first spring 34 is small and exerts a weak biasing force, the first spring can sufficiently bias the operation member 60 in the returning direction. Because it is possible to obtain a sufficient biasing force by the small first spring 34, it is possible to reduce the size of the locking device 30. Accordingly, it is possible to provide the vehicle storage device 10 having the small locking device 30. Further, because the biasing force applied from the first spring 34 to the main body 61 of the operation member can be reduced, the load applied to the main body 61 of the operation member can be reduced, and therefore it is possible to extend the life of the storage device 10.

The first spring 34 and the second spring 35 are disposed in overlapping positions at the approximate center of the operation member 60 when viewed in the third direction (width direction). Thus, it is possible to stably actuate the operation member 60 and the engagement member 70.

The second spring 35 is the compression coil spring and disposed to face the rear face of the engagement member 70 such that the second spring biases the hook portion 75 toward the storage portion 11 from the rear face of the engagement member 70. The position away from the swing axis of the engagement member 70 can be biased by the second spring 35. Thus, even if the second spring 35 is small and exerts a weak biasing force, it is possible to sufficiently bias the engagement member 70 in the returning direction. In other words, it is possible to obtain a sufficient biasing force from the small second spring 35, and it is possible to reduce the size of the locking device 30. It is possible to provide the vehicle storage device 10 having a much smaller locking device 30. Further, since it is possible to reduce the biasing force applied from the second spring 35 to the main body 71 of the engagement member, it is possible to reduce the load applied to the main body 71 of the engagement member, and it is possible to extend the life of the engagement member. Further, when the lid 20 is closed, the lid can be pushed in with a small force, and therefore the operability is improved.

The locking device 30 includes the support member 40 that supports the operation member 60 and the engagement member 70 provided on the lid 20 such that both of the operation member and the engagement member can swing, and the second spring support member 80 that holds one end of the second spring 35 fixed to the support member 40. By having the support member 40 and the second spring support member 80, it is possible to make a unit of the operation member 60, the engagement member 70, the first spring 34 and the second spring 35. The unitized locking device 30 can be assembled to the lid 20. As compared with a configuration that assembles each of the respective parts to the lid 20, it is possible to facilitate the assembly work.

It should be noted that the storage device according to the embodiment of the present invention has been described taking the center console as an example, the present invention is also applicable to a glove box or the like. As long as the operation and effect of the present invention are achieved, the present invention is not limited to the embodiment.

What is claimed is:

1. A storage device for a vehicle, comprising: a storage portion that has an opening in its one face and can store at least one thing therein, a lid that is provided on the storage portion and can open and close at least a portion of the opening of the storage portion, and a locking device that can keep the lid in a closed condition, the locking device comprising an operation member for performing an unlocking operation of the lid, an engagement member that is provided such that the engagement member can be engaged with the storage portion and its engaged state is released when the operation member is operated, a first spring that biases the operation member toward a standby position in a locked state, and a second spring that biases the engagement member toward an engagement position in which the engagement member is engaged with the storage portion, the engagement member having a hook-shaped hook portion that can engage with the storage portion, and the second spring is disposed to face a rear face of the engagement member such that the second spring biases the hook portion toward the storage portion from the rear face of the engagement member.

2. The storage device for the vehicle according to claim 1, wherein an axis of the first spring and an axis of the second spring extend parallel to each other.

3. The storage device for vehicle according to claim 2, wherein when a direction in which the axis of the first spring and the axis of the second spring extend is a first direction, a direction perpendicular to the first direction and passing through the axis of the first spring and the axis of the second spring is a second direction, and a direction perpendicular to the first direction and the second direction is a third direction, the first spring and the second spring are disposed in overlapping positions at an approximate center of the operation member when viewed in the third direction.

4. The storage device for the vehicle according to claim 1, wherein the locking device further comprises a support member that swingably supports both of the engagement member and the operation member provided on the lid, and a second spring supporting member that is fixed to the support member and holds one end of the second spring.

5. The storage device for the vehicle according to claim 1, wherein the second spring is in contact with a second contact portion of the engagement member, which is formed in a concave shape in the rear face of the engagement member.

* * * * *